(12) United States Patent
Degenhardt et al.

(10) Patent No.: US 12,397,182 B2
(45) Date of Patent: Aug. 26, 2025

(54) OXYGEN GENERATOR FOR USE IN AN AIRCRAFT, PASSENGER OXYGEN MASK SYSTEM, AND AIRCRAFT

(71) Applicant: B/E Aerospace Systems GmbH, Lübeck (DE)

(72) Inventors: Detlev Degenhardt, Stockelsdorf (DE); Phillip Ritter, Lübeck (DE)

(73) Assignee: B/E Aerospace Systems Gmbh, Lubeck (DE)

( * ) Notice: Subject to any disclaimer, the term of this patent is extended or adjusted under 35 U.S.C. 154(b) by 602 days.

(21) Appl. No.: 17/869,318

(22) Filed: Jul. 20, 2022

(65) Prior Publication Data

US 2023/0034393 A1 Feb. 2, 2023

(30) Foreign Application Priority Data

Jul. 28, 2021 (EP) .................................... 21188227

(51) Int. Cl.
*A62B 21/00* (2006.01)
*A62B 7/14* (2006.01)

(52) U.S. Cl.
CPC ............... *A62B 21/00* (2013.01); *A62B 7/14* (2013.01)

(58) Field of Classification Search
CPC ....... A62B 21/00; A62B 7/00–02; A62B 7/08; A62B 7/14; A62B 9/006
See application file for complete search history.

(56) References Cited

U.S. PATENT DOCUMENTS

| | | | |
|---|---|---|---|
| 3,443,907 A | 5/1969 | Mausteller | |
| 3,615,250 A | 10/1971 | Vernon | |
| 3,797,854 A * | 3/1974 | Poole | F42B 3/04 |
| | | | 149/35 |
| 5,596,163 A | 1/1997 | Caflisch et al. | |
| 5,772,976 A | 6/1998 | Cortellucci et al. | |
| 6,155,254 A | 12/2000 | Evrard et al. | |
| 8,171,932 B2 | 5/2012 | Rittner et al. | |
| 8,261,744 B2 | 9/2012 | Rittner et al. | |
| 9,119,977 B2 | 9/2015 | Rittner et al. | |

(Continued)

OTHER PUBLICATIONS

European Patent Office; Extended European Search Report dated Apr. 14, 2022 in Application No. 21188227.9-1113.
(Continued)

*Primary Examiner* — Rachel T Sippel
(74) *Attorney, Agent, or Firm* — SNELL & WILMER L.L.P.

(57) ABSTRACT

An oxygen generator for use in a passenger aircraft comprises an oxygen generating substance for generating oxygen gas after being activated; an activating substance for activating the oxygen generating substance; a pyroelectric igniter for igniting the activating substance upon receiving an electric trigger input; a housing defining a gas-tight chamber, accommodating the oxygen generating substance, the activating substance and the pyroelectric igniter; at least two electric conductors, coupled to the pyroelectric igniter and extending through a passage in the housing between an interior of the gas-tight chamber and an exterior of the gas-tight chamber; and at least one of a gas-tight glass-to-metal sealing and a gas-tight ceramic-to-metal sealing, sealing the at least two electric conductors with respect to the housing at the passage.

20 Claims, 5 Drawing Sheets

(56) References Cited

U.S. PATENT DOCUMENTS

2010/0000526 A1* 1/2010 Rittner .................. B64D 10/00
                                                         128/202.26
2014/0000591 A1* 1/2014 Hollm .................... A62B 7/14
                                                         128/202.26

OTHER PUBLICATIONS

European Patent Office; Partial European Search Report dated Jan. 21, 2022 in Application No. 21188227.9-1113.
European Patent Office, European Office Action dated Aug. 2, 2024 in Application No. 21188227.9.

* cited by examiner

OXYGEN GENERATOR FOR USE IN AN AIRCRAFT, PASSENGER OXYGEN MASK SYSTEM, AND AIRCRAFT

CROSS-REFERENCE TO RELATED APPLICATIONS

This application claims priority to, and the benefit of, EP Patent Application No. 21188227.9, filed Jul. 28, 2021 (DAS Code 6C6F) and titled "OXYGEN GENERATOR FOR USE IN AN AIRCRAFT, PASSENGER MASK SYSTEM, AND AIRCRAFT," which is incorporated by reference herein in its entirety for all purposes.

FIELD

The present invention is in the field of aircraft equipment. The present invention is in particular in the field of emergency equipment for aircraft. Further in particular, the present invention is in the field of oxygen generators for use in a passenger aircraft, passenger oxygen mask systems, and aircraft comprising such passenger oxygen mask systems.

Modern aircraft comprising a pressurized cabin are equipped with emergency oxygen masks, which are deployed for the passengers in case of a loss of cabin pressure during flight. The passenger oxygen masks are part of self-sustained emergency oxygen systems, including oxygen generators that provide oxygen gas to the passengers in case cabin pressure is lost.

BACKGROUND

In a conventional oxygen generator, the production of oxygen gas is started by a mechanical activator, which is mechanically activated when one of the oxygen mask is grabbed and pulled towards a passenger. For allowing such a mechanical activation, the oxygen generator needs to be mechanically coupled with the oxygen masks.

In order to allow for such a mechanical coupling, the oxygen generator needs to be located in the vicinity of the passengers, in particular in an area which is viewable and reachable by the passengers. Such positioning may cause problems in operation as it allows passengers to access the oxygen generator, which may result in unauthorized manipulation and/or damage of the oxygen generator by passengers.

Accordingly, it would be beneficial to provide an oxygen generator which may be installed in some distance from the passengers, in particular in a position in which is out of sight and out of reach of the passengers.

SUMMARY

Exemplary embodiments of the invention include an oxygen generator for use in a passenger aircraft, in particular for use in a passenger oxygen mask system of a passenger aircraft, the oxygen generator comprising: an oxygen generating substance for generating oxygen gas after being activated; an activating substance for activating the oxygen generating substance in order to produce oxygen gas; and a pyroelectric igniter for igniting the activating substance upon receiving an electric trigger input. The oxygen generator further comprises a housing defining a gas-tight chamber accommodating the oxygen generating substance, the activating substance and the pyroelectric igniter; at least two electric conductors, coupled to the pyroelectric igniter and extending through a passage formed in the gas-tight housing between an interior of the gas-tight chamber and an exterior of the gas-tight chamber; and at least one of a gas-tight glass-to-metal sealing and a gas-tight ceramic-to-metal sealing, sealing the at least two electric conductors with respect to the housing at the passage.

Exemplary embodiments of the invention also include a method of operating an oxygen generator according to an embodiment of the invention, wherein the method includes activating the pyroelectric igniter by supplying an electric trigger input, such as an ignition voltage and/or an ignition current, to the pyroelectric igniter.

Exemplary embodiments of the invention further include an aircraft passenger oxygen supply module for supplying oxygen to at least one aircraft passenger, the aircraft passenger oxygen supply module comprising an oxygen generator according to an embodiment of the invention, and at least one oxygen mask fluidly coupled to an oxygen output of the oxygen generator.

Exemplary embodiments of the invention also include a passenger aircraft comprising a plurality of oxygen generators according to an embodiment of the invention and/or a plurality of aircraft passenger oxygen supply modules according to an embodiment of the invention. The passenger aircraft may in particular be an airplane or a helicopter.

An oxygen generator in accordance with exemplary embodiments of the invention may be activated by applying an electric trigger input, in particular an ignition voltage and/or an ignition current, to the electric conductors. As a result, an oxygen generator in accordance with exemplary embodiments of the invention may be activated purely electrically, for example by closing an electric switch. The electric switch, for example, may be activated by a passenger grabbing and pulling an oxygen mask, similar to a conventional configuration.

When an oxygen generator in accordance with exemplary embodiments of the invention is employed, there is no need for providing a mechanical coupling between the oxygen generator and a passenger, in order to allow the passenger to activate the oxygen generator. Thus, the oxygen generator may be arranged in some distance from the passengers, the oxygen generator may in particular be installed in a position out of sight and out of reach of the passengers. In such a configuration, passengers may have no access to the oxygen generator, so that they are not able to manipulate the oxygen generator. In consequence, the reliability of the oxygen generator is enhanced. An oxygen generator in accordance with exemplary embodiments of the invention also may be located in a location more distant from the passenger seats where more space is available. This may facilitate the installation of the oxygen generator.

In an embodiment, the pyroelectric igniter is configured for directly igniting the activating material, and there is no need for providing an additional starter component ("start powder"), as it is employed in conventional mechanical activators. In consequence, the configuration of the mechanical activator may be simplified and the production costs may be reduced.

In an embodiment, the oxygen generating substance is activated by igniting the activating substance. The activating substance may be provided in the form of an ignition plate arranged next to the oxygen generating substance. Activating the oxygen generating substance by means of an ignition plate has been found as a reliable and efficient way of starting the production of oxygen by the oxygen generating substance. The ignition plate is configured for providing heat within a short period of time after its ignition, for example within 10 seconds or less. The ignition plate may comprise a highly reactive mixture including sodium chlorate and sodium monoxide.

In an embodiment, the pyroelectric igniter includes an electric glow wire, which is electrically coupled to the electric conductors and which is in contact with at least one heat sensitive and explosive substance. The electric glow wire may in particular be surrounded by the at least one heat sensitive and highly reactive substance. An electric glow wire may provide a simple, efficient, reliable and inexpensive means for igniting the heat sensitive and highly reactive substance of the pyroelectric igniter.

In an embodiment, the pyroelectric igniter is configured for being operated by applying an ignition voltage in the range of between 100 V and 150 V, in particular by applying an ignition voltage in the range of between 110 V and 120 V, more particularly by applying an ignition voltage of approximately 115 V.

In an embodiment, the pyroelectric igniter is configured for being operated by applying an ignition voltage in the range of between 20 V and 35 V, in particular by applying an ignition voltage in the range of between 25 V and 30 V, more particularly by applying an ignition voltage of approximately 28 V.

Voltages within these ranges are usually supplied by electric aircraft power systems. Thus, a pyroelectric igniter, which is configured for being operated with an ignition voltage in these voltage ranges, may be operated by directly supplying electric power from an electric aircraft power system without a need for power conversion.

In an embodiment, the oxygen generator may include an oxygen generating substance including iron, which is directly or indirectly ignited by the pyroelectric igniter.

In an embodiment, the oxygen generating substance includes sodium chlorate and sodium monoxide. A mixture including sodium chlorate and sodium monoxide has been found as an efficient mixture for generating gaseous oxygen. Also, after the chemical reaction and the release of oxygen, sodium chloride remains in the oxygen generator, which is easy to dispose of. As compared to iron-based processes, an oxygen generator employing sodium chlorate may lead to a more sustainable emergency oxygen system and/or to an emergency oxygen system having good recyclability. As the reactivity of sodium monoxide is deteriorated by exposure to water and moisture, an oxygen generator is sensitive to sealing issues. It has been found that the gas-tight glass-to-metal sealing and gas-tight ceramic-to-metal sealing of oxygen generators according to exemplary embodiments of the invention work particularly well for maintaining sodium monoxide in a desired water/moisture-free environment, while accommodating a pyroelectric ignition framework.

In an embodiment, the oxygen generator includes a bushing, forming a passage for the at least two electric conductors between the interior of the gas-tight chamber provided by the housing and the exterior of the gas-tight chamber. In such a configuration, the gas-tight sealing may be provided within the bushing for sealing the passage of the at least two electric conductors. A bushing has been found as an efficient means for providing a gas-tight, sealed passage for the at least two electric conductors between the interior and the exterior of the gas-tight chamber provided by the housing.

In an embodiment, the bushing is welded or soldered to the housing. Welding and soldering have been found as efficient and reliable methods for connecting the bushing to the housing in a gas-tight manner.

In an embodiment, the gas-tight sealing is at least one of a glass-to-metal sealing and a ceramic-to-metal sealing. Commercially available glass-to-metal sealings and ceramic-to-metal sealings both have been found as providing efficient and reliable sealings under the operational conditions of oxygen generators in aircraft environments. A ceramic-to-metal sealing may comprise a mixture of glass and a ceramic material as the sealing material. Using such a sealing may be beneficial in configurations in which complex conductor paths are formed within the housing.

In an embodiment, the bushing comprises a collar extending along an outer periphery of the bushing. A collar extending from the bushing may be efficiently welded or soldered to the housing for connecting the bushing to the housing in a gas-tight manner. The collar may also be referred to as a hump, extending along the outer periphery of the bushing.

In an embodiment, the aircraft passenger oxygen supply module comprises a compartment, providing a storage space for storing the at least one oxygen mask; a movable door, which is movable between a closed position, closing the compartment, and an open position, in which the compartment is open, providing access to the at least one oxygen mask; a locking mechanism, which is movable between a locked position, in which the movable door is locked, and an unlocked position, in which the movable door is not locked; and an actuator for moving the locking mechanism between the locked position and the unlocked position.

Such an aircraft passenger oxygen supply module may allow for safely storing the oxygen masks as long as they are not needed. It may further allow for a fast access to the oxygen masks in an emergency situation, including a pressure drop within the passenger cabin of the aircraft.

Exemplary embodiments of the invention also include a method of operating an aircraft passenger oxygen supply module according to an embodiment of the invention, wherein the method includes operating the actuator for moving the locking mechanism into its unlocked position, releasing the movable door, and activating the pyroelectric igniter by supplying an electric trigger input, in particular an ignition voltage and/or an ignition current, to the pyroelectric igniter via the electric conductors.

In an embodiment, the aircraft passenger oxygen supply module further comprises an AC/DC electric power converter for converting AC electric power, which is supplied from the electric aircraft power system to the aircraft passenger oxygen supply module, to DC electric power. The aircraft passenger oxygen supply module may further comprise an electric storage device, which in particular may include at least one capacitor, for storing DC electric power. Such a configuration may allow for storing converted DC electric power in the electric storage device in order to reduce the electric load on an (emergency) power supply system supplying electric power to the aircraft passenger oxygen supply module.

In an embodiment, the aircraft passenger oxygen supply module is configured for selectively supplying AC electric power to the actuator for unlocking the locking mechanism and for selectively supplying DC electric power to the pyroelectric igniter for activating the pyroelectric igniter. Such a configuration may allow for using DC electric power, which has been stored within the electric storage device, for operating the pyroelectric igniter in the event of failure of the electric aircraft power system. It may further allow for using a conventional actuator, which is configured for being operated with AC electric power, for unlocking the locking mechanism.

In an embodiment, the aircraft passenger oxygen supply module is configured for selectively supplying DC electric power to the actuator for unlocking the locking mechanism and for selectively supplying DC electric power to the pyroelectric igniter for activating the pyroelectric igniter. Such a configuration may allow for using DC electric power, which has been stored within the electric storage device, for operating the pyroelectric igniter and the actuator in the event of failure of the electric aircraft power system. It may further allow for using the actuator and the movable door as an indicator of the functionality of the aircraft passenger oxygen supply module.

In an embodiment, the aircraft passenger oxygen supply module is selectively operable in a test mode and in an emergency mode. Operating the aircraft passenger oxygen supply module in the emergency mode includes activating the pyroelectric igniter and operating the actuator for opening the locking mechanism. Operating the aircraft passenger oxygen supply module in the test mode includes checking the electric conductivity of the pyroelectric igniter and/or operating the actuator for opening the locking mechanism. This may allow for checking the operability of the aircraft passenger oxygen supply module without activating the oxygen generator.

In an embodiment, checking the aircraft passenger oxygen supply module includes operating the actuator for opening the locking mechanism and/or checking the electric conductivity of the pyroelectric igniter. The method may in particular include visually signaling the result of checking the electric conductivity of the pyroelectric igniter by operating a signaling LED and/or by opening the movable door of the aircraft passenger oxygen supply module only if the pyroelectric igniter has been detected as being intact.

In an embodiment, the aircraft passenger oxygen supply module comprises a sensor for detecting whether a passenger seat, associated with the aircraft passenger oxygen module, is occupied, and the aircraft passenger oxygen module may be configured for supplying electric power to the pyroelectric igniter only if the sensor detects that the passenger seat, associated with the oxygen generator, is occupied. Such a configuration may prevent wasting oxygen generating material by unnecessarily activating oxygen generators associated with unoccupied passenger seats.

BRIEF DESCRIPTION OF THE DRAWINGS

Further exemplary embodiments of the invention are described below with respect to the accompanying drawings, wherein.

DETAILED DESCRIPTION

Figure 1:
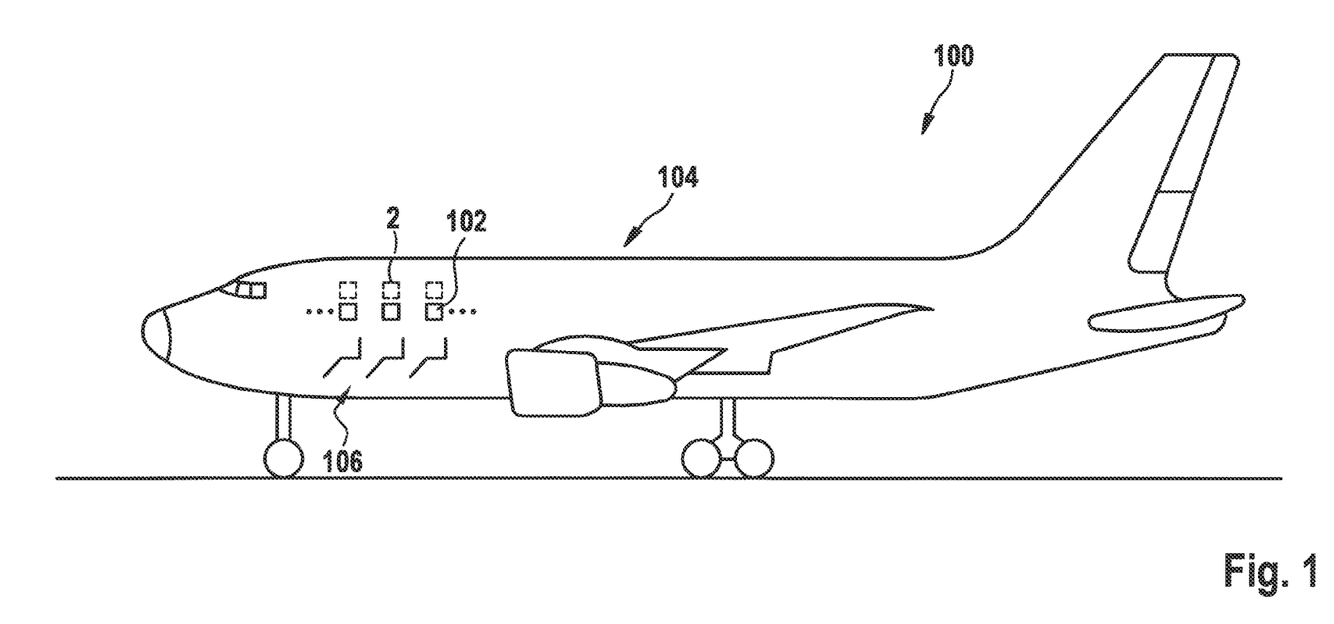
FIG. 1 shows an aircraft, in particular an airplane, in accordance with an exemplary embodiment of the invention in a schematic side view.

FIG. 1 shows an aircraft 100, in particular an airplane, in accordance with an exemplary embodiment of the invention in a schematic side view. In the exemplary embodiment shown in FIG. 1, the aircraft 100 is a large passenger airplane comprising a passenger cabin 104 housing a plurality of passenger seats 106. The aircraft 100 may be a commercial passenger airplane, a private airplane, a military aircraft, or a rotorcraft, such as a helicopter.

The aircraft 100 comprises a plurality of aircraft passenger oxygen supply modules 2.

In an exemplary configuration, in which the aircraft 100 comprises six passenger seats 106 in every row, each row of passenger seats 106 may have two aircraft passenger oxygen supply modules 2 associated therewith, one aircraft passenger oxygen supply module 2 assigned to the passenger seats 106 on the left side of a center aisle and one aircraft passenger oxygen supply module 2 assigned to the passenger seats 106 on the right side of the center aisle, respectively.

For the exemplary embodiment of each row of passenger seats 106 having six seats, every aircraft passenger oxygen supply module 2 may have one oxygen generator 20 and three oxygen masks 12, coupled to the oxygen generator 20. Such a set-up is schematically illustrated in FIG. 1 via three exemplary passenger windows 102, each being associated with a row of passenger seats 106, and via three exemplary aircraft passenger oxygen supply modules 2, depicted in phantom due to their arrangement within the aircraft 100.

Figure 2:
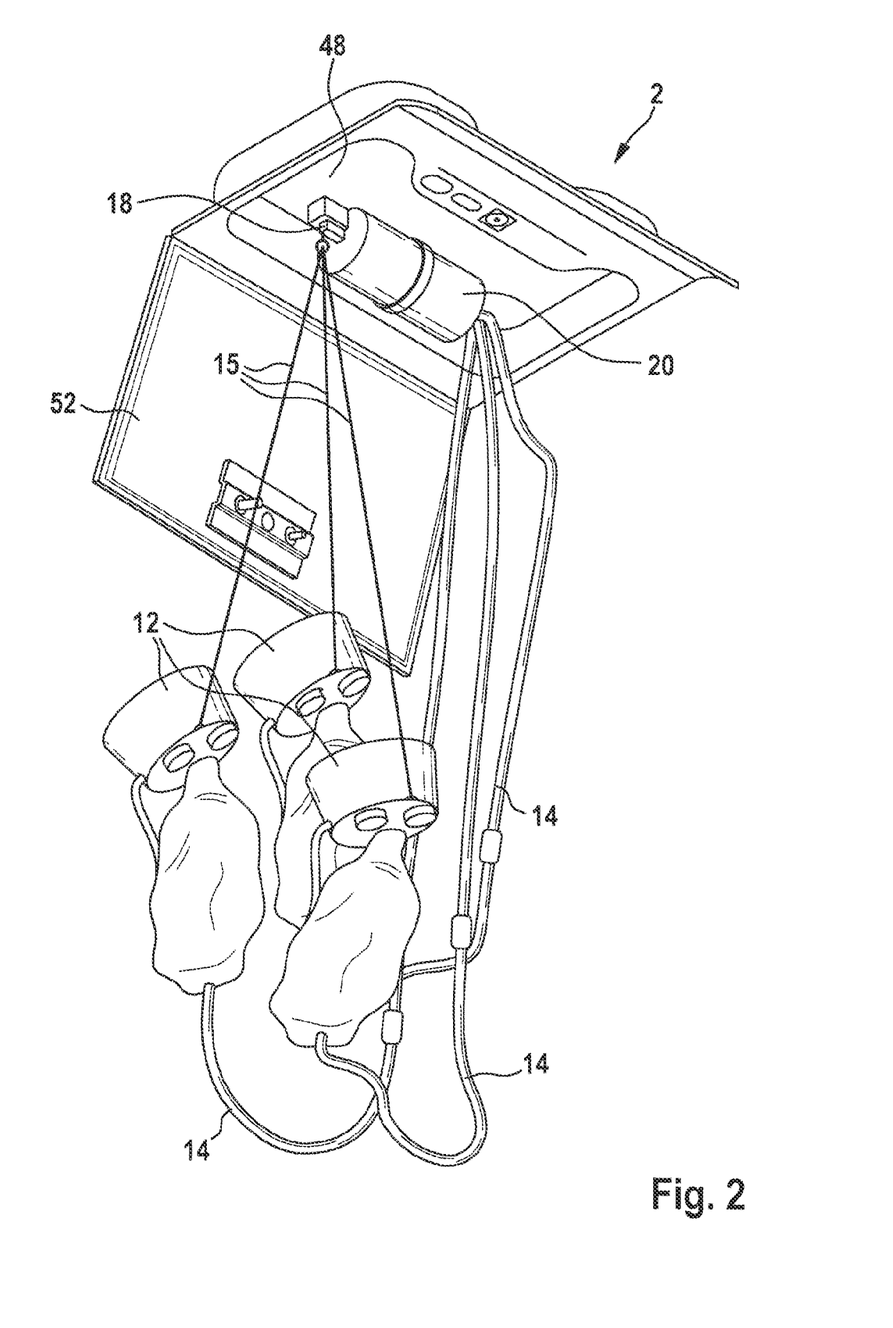
FIG. 2 shows a perspective view of an aircraft passenger oxygen supply module in accordance with an exemplary embodiment of the invention, with the oxygen masks of the aircraft passenger oxygen supply module being shown in a deployed state.

FIG. 2 depicts an aircraft passenger oxygen supply module 2 in accordance with an exemplary embodiment of the invention, as it may be installed in the passenger cabin 104 of an aircraft 100. The aircraft passenger oxygen supply module 2 comprises an oxygen generator 20 and three oxygen masks 12. Each oxygen mask 12 is fluidly coupled with the oxygen generator 20 by an oxygen hose 14, allowing the oxygen generator 20 to supply oxygen gas to the respective oxygen mask 12. A mechanical link 15, such as a wire or a cord, extends between an activator 18 of the oxygen generator 20 and every oxygen mask 12, respectively.

During normal operation of the aircraft 100, the oxygen masks 12 are stored within a compartment 48, provided within the aircraft passenger oxygen supply module 2, and a movable door 52 of the aircraft passenger oxygen supply module 2 is closed, covering the oxygen masks 12 and the oxygen generator 20.

In case of pressure loss within the passenger cabin 104, the movable door 52 opens, allowing the oxygen masks 12 to drop out of the compartment 48, so that passengers sitting below the compartment 48 may grab the oxygen masks 12. When at least one of the oxygen masks 12 is grabbed and pulled towards a passenger, the activator 18 is mechanically triggered via the mechanical link 15, also referred to as lanyard 15, extending between the respective oxygen mask 12 and the activator 18. After being triggered, the activator 18 provides an electric trigger input to the oxygen generator 20 for initiating the production of oxygen gas by the oxygen generator 20. Details of this procedure will be laid out below.

As described above, the aircraft passenger oxygen supply module 2 of FIG. 2 relies on the combination of a mechanical trigger by the passenger via the mechanical link 15 and the electric trigger from the activator 18 to the oxygen generator 20. This is different from previous approaches, where the mechanical link 15 was coupled to a mechanical activator, which, as a response to the passenger pulling the mechanical link 15, mechanically activated a mechanically triggered oxygen generator. The activator 18 and the oxygen generator 20 according to exemplary embodiments of the present invention may be readily retrofitted into existing aircraft passenger oxygen supply modules, because the mechanical links 15 of existing aircraft passenger oxygen supply modules may be used for triggering an electric activator 18 as well. However, with the oxygen generator 20 according to exemplary embodiments of the invention being electrically triggered, different activation mechanisms are also possible. Also, the oxygen generator 20 may be arranged at larger distances from the activator 18, in particular at distances that would be difficult or even impossible to bridge in the crammed aircraft environment with a mechanical activator. The oxygen generator 20 according to exemplary embodiments of the invention may be placed with great flexibility. In particular, the oxygen generator 20 may be placed out of sight and/or out of reach for the passengers. This in turn may help in the unauthorized manipulation and/or damage of the oxygen generator 20 by passengers, in particular in aircraft locations that cannot be overseen by the crew, such as lavatories.

Figure 3:
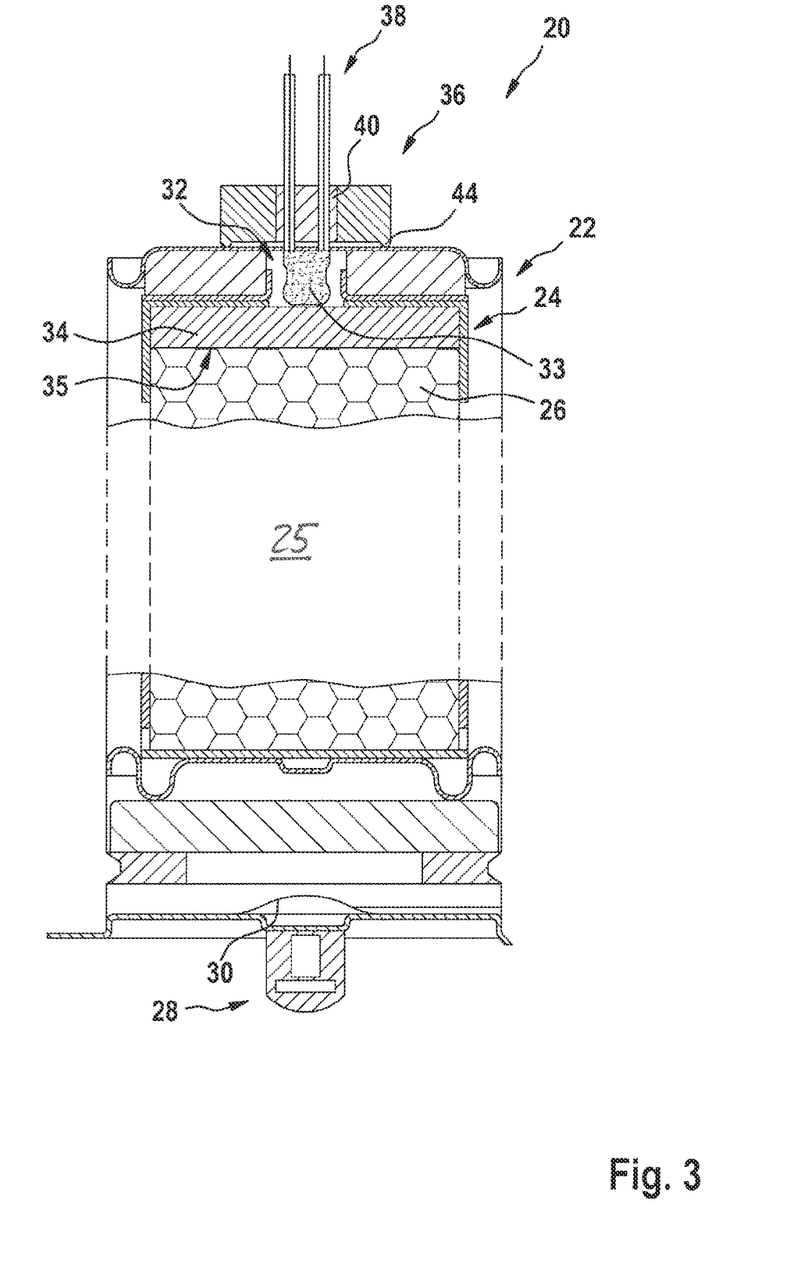
FIG. 3 depicts a schematic cross-sectional view through an oxygen generator in accordance with an exemplary embodiment of the invention.
Figure 4:
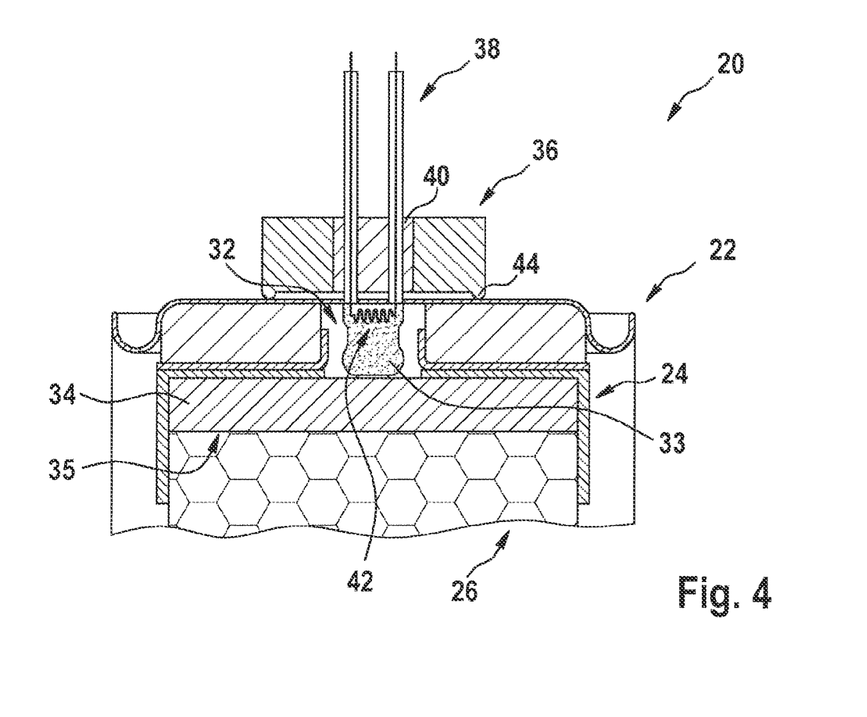
FIG. 4 depicts an enlarged detail of the upper portion of the oxygen generator shown in FIG. 3.

FIG. 3 depicts a schematic longitudinal cross-sectional view of an oxygen generator 20 in accordance with an exemplary embodiment of the invention. FIG. 4 depicts an enlarged detail of the upper portion of the oxygen generator 20 shown in FIG. 3.

The oxygen generator 20, as shown in FIGS. 3 and 4, has a cylindrical metal housing 22, defining a gas-tight, sealed chamber 25. The gas-tight chamber 25 accommodates an oxygen generating substance 26, for example a mixture including sodium monoxide and sodium chlorate, which, after being activated, produces oxygen gas for being supplied to the passengers. In an alternative embodiment, the oxygen generating substance 26 may include an iron-based substance in-stead of sodium monoxide.

The oxygen generator 20 has an oxygen outlet 28, which is shown in the lower portion of FIG. 3 and which is configured for being coupled to a conduit or hose 14 for delivering the oxygen gas, produced by the oxygen generating substance 26, to at least one oxygen mask 12 (cf. FIG. 2).

As long as the oxygen generating substance 26 has not been activated, the front side of the gas-tight chamber 25, facing the oxygen outlet 28, is sealed by a gas-tight membrane 30. After the oxygen generating substance 26 has been activated, the gas-tight membrane 30 is punctured or ruptured, allowing the oxygen gas, produced by the oxygen generating substance 26, to exit the gas-tight chamber 25 via the oxygen outlet 28 for being delivered to at least one oxygen mask 12. The gas-tight membrane 30 may in particular be punctured or ruptured by the increased pressure of the produced oxygen gas.

The oxygen generator 20 further comprises an ignition plate 35, including an activating substance 34, for example a heat-generating substance, for activating the oxygen generating substance 26. The ignition plate 35 is arranged next to the oxygen generating substance 26 at an end portion of the gas-tight chamber 25 opposite to the oxygen outlet 28 and the gas-tight membrane 30. The oxygen generating substance 26 and the ignition plate 35 are supported by a support structure 24 provided within the housing 22.

The oxygen generating substance 26 is activated for producing oxygen gas by igniting the activating substance of the ignition plate 35. The activating substance of the ignition plate 35 in turn is ignited by a pyroelectric igniter 32, provided within the gas-tight chamber 25. In the exemplary embodiment of FIG. 3, the pyroelectric igniter 32 and the oxygen generating substance 26 are provided on opposite sides of the ignition plate 35.

The pyroelectric igniter 32 comprises a heat sensitive and explosive pyroelectric substance 33, which may be ignited by applying a sufficiently large electric voltage to two electric conductors 38, extending between an interior of the gas-tight chamber 25 and an exterior of the gas-tight chamber 25. In particular, the two electric conductors 38 extend through a passage formed in the end face of the gas-tight sealed chamber 25, with said end face and the oxygen outlet 28 being arranged on opposite sides of the oxygen generator 20.

In order to prevent gas, water and moisture from entering into the gas-tight chamber 25, the passage is sealed by a gas-tight sealing 40, sealing the at least two electric conductors 38 with respect to the gas-tight chamber 25.

The gas-tight sealing 40 may be a glass-to-metal sealing 40, comprising glass as a sealing material, or a ceramic-to-metal sealing 40, which may comprise a mixture of glass and a ceramic material as the sealing material. A ceramic-to-metal sealing 40 may work particularly well when more complex conductor paths are formed within the wall of the housing 22 defining the gas-tight chamber 25.

A glass-to-metal sealing 40 and a ceramic-to-metal sealing 40 both provide a highly reliable gas-tight sealing of the gas-tight chamber 25. In particular, they may reliably prevent moisture, which would deteriorate the oxygen generating substance 26, from entering into the gas-tight chamber 25.

The pyroelectric igniter 32 may include an electric glow wire 42, which is electrically coupled with the electric conductors 38 and in contact with, in particular surrounded by, the pyroelectric substance 33.

An electric trigger input, in particular an electric voltage exceeding a predefined threshold voltage and being applied to the electric conductors 38 for at least a predetermined amount of time, causes an electric current to flow through the electric glow wire 42 which generates sufficient heat for igniting the pyroelectric substance 33. Ignition of the pyroelectric substance 33 ignites the activating substance of the ignition plate 35, which in turn activates the oxygen generating sub-stance 26 for producing oxygen gas.

Thus, an oxygen generator 20 in accordance with exemplary embodiments of the invention may be activated by applying an electric trigger input, in particular a suitable electric voltage, to the electric conductors 38. As a result, the oxygen generator 20 may be activated purely electrically, e.g. by closing an electric switch (not shown). There is in particular no need for providing a direct mechanical coupling between the oxygen generator 20 and the oxygen masks 12, in order to allow activating the oxygen generator 20. The electric switch, for example, may be activated by a passenger grabbing and pulling an oxygen mask 12, similar to a conventional configuration. The oxygen generator 20, however, may be arranged in some distance from the switch, so that it is not accessible to the passengers.

The pyroelectric igniter 32 may be configured for being operated with an ignition voltage $U_{ign}$ in the range of between 100 V and 150 V, in particular with an ignition voltage $U_{ign}$ in the range of between 110 V and 120 V, more particularly with an ignition voltage $U_{ign}$ of approximately 115 V.

Alternatively or additionally, the pyroelectric igniter 32 may be configured for being operated by applying an ignition voltage $U_{ign}$ in the range of between 20 V and 35 V, in particular by applying an ignition voltage $U_{ign}$ in the range of between 25 V and 30 V, more particularly by applying an ignition voltage $U_{ign}$ of approximately 28 V.

The voltage level of the ignition voltage $U_{ign}$ may be readily available in an electric power system of the aircraft 100. In consequence, the electric voltage supplied by the electric power system of the aircraft 100 does not need to be converted for operating the pyroelectric igniter 32.

The ignition voltage $U_{ign}$ for which the pyroelectric igniter 32 is configured may vary depending on the type of aircraft 100 in which the pyroelectric igniter 32 is intended to be installed.

The exemplary embodiment of the oxygen generator 20, depicted in FIGS. 3 and 4, further includes a bushing 36, forming a passage for the at least two electric conductors 38 between the interior of the gas-tight chamber 25 and the exterior of the gas-tight chamber 25. The bushing 36 may also be referred to as a feed for the at least two electric conductors 38 into/out of the gas-tight chamber 25. The gas-tight sealing 40 is formed in an opening within said bushing 36, passing the at least two electric conductors 38.

The bushing 36 may be welded or soldered to the gas-tight chamber 25 for providing a gas-tight connection between the bushing 36 and the gas-tight chamber 25.

In the exemplary embodiment depicted in FIGS. 3 and 4, the bushing 36 comprises a collar 44, forming a circular hump along the outer periphery of the side of the bushing 36 facing the gas-tight chamber 25. Such a collar 44 may facilitate connecting the bushing 36 to the housing 22 in a gas-tight manner, for example by welding or soldering.

Figure 5:
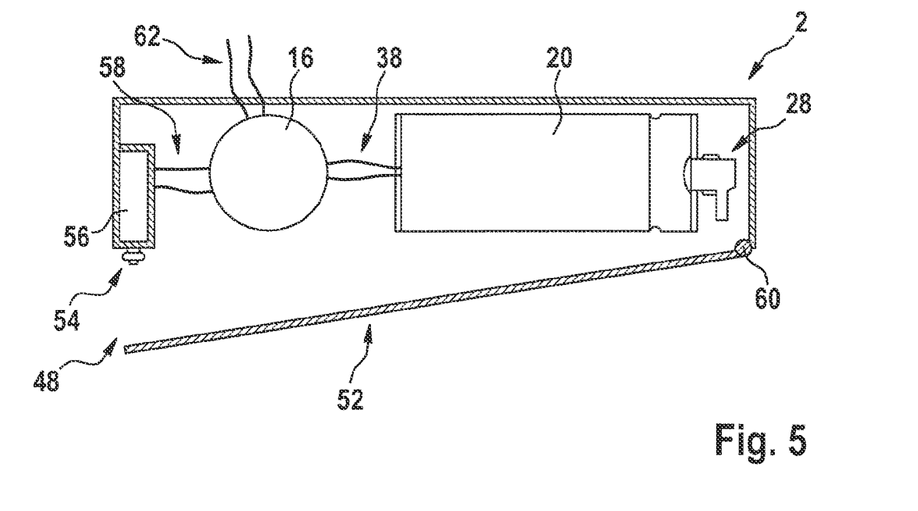
FIG. 5 depicts a schematic cross-sectional view of an aircraft passenger oxygen supply module comprising an oxygen generator according to an exemplary embodiment of the invention.

FIG. 5 depicts a schematic cross-sectional view of selected components of an aircraft passenger oxygen supply module 2 of an emergency oxygen system 2 according to an exemplary embodiment of the invention. The aircraft passenger oxygen supply module 2 comprises an oxygen generator 20 according to an exemplary embodiment of the invention, and a controller 16 for controlling the operation of the oxygen generator 20.

In an operational configuration, the oxygen outlet 28 of the oxygen generator 20 is fluidly coupled to at least one oxygen mask 12 by a hose 14, as for example shown in the configuration depicted in FIG. 2. The at least one oxygen mask 12 and the corresponding hose 14 are not depicted in FIG. 5.

The aircraft passenger oxygen supply module 2 includes a compartment 48 providing a storage space for storing the at least one oxygen mask 12. The aircraft passenger oxygen supply module 2 further comprises a movable door 52, which is movable between a closed position, closing the compartment 48, and an open position, in which the compartment 48 is open, providing access to the at least one oxygen mask 12.

The aircraft passenger oxygen supply module 2 further comprises a locking mechanism 54, which is movable between a locked position, in which the movable door 52 is locked in its closed position, and an unlocked position, in which the movable door 52 is not locked.

When the locking mechanism 54 is in its unlocked position, the movable door 52 may open due to the forces of gravity. Alternative or additionally, the aircraft passenger oxygen supply module 2 may comprise a drive mechanism 60, in particular a drive mechanism 60 including an elastic element, such as a spring, for opening the movable door 52, when the locking mechanism 54 is in its unlocked position.

The aircraft passenger oxygen supply module 2 also comprises an actuator 56 for moving the locking mechanism 54 between the locked and unlocked positions.

Electric conductors 38, 58 electrically couple the controller 16 with the oxygen generator 20 and the actuator 56, allowing the controller 16 to control their operation. The controller 16 is electrically coupled to a power supply system of the aircraft 100 by means of electric conductors 62.

The power supply system of the aircraft 100 may supply AC electric power in a range of between 100 V and 150 V, in particular AC electric power in a range of between 110 V and 120 V, more particularly AC electric power of approximately 115 V, to the controller 16. The power supply system may in particular provide AC electric power having a frequency in the range of between 380 Hz and 420 Hz, in particular AC electric power having a frequency in the range of between 390 Hz and 410 Hz, more particularly AC electric power having a frequency of approximately 400 Hz. In an alternative embodiment, the power supply system may pro-vide AC electric power having a variable frequency of up to 800 Hz.

In another embodiment, the power supply system of the aircraft 100 may supply DC electric power in the range of between 20 V and 35 V, in particular DC electric power in a range of between 25 V and 30 V, more particularly DC electric power of approximately 28 V.

The controller 16 may be coupled to the activator 18, as shown in and described above with respect to FIG. 2, for receiving a trigger from a passenger. The controller 16 may additionally/alternatively be coupled to other suitable trigger means.

Figure 6:
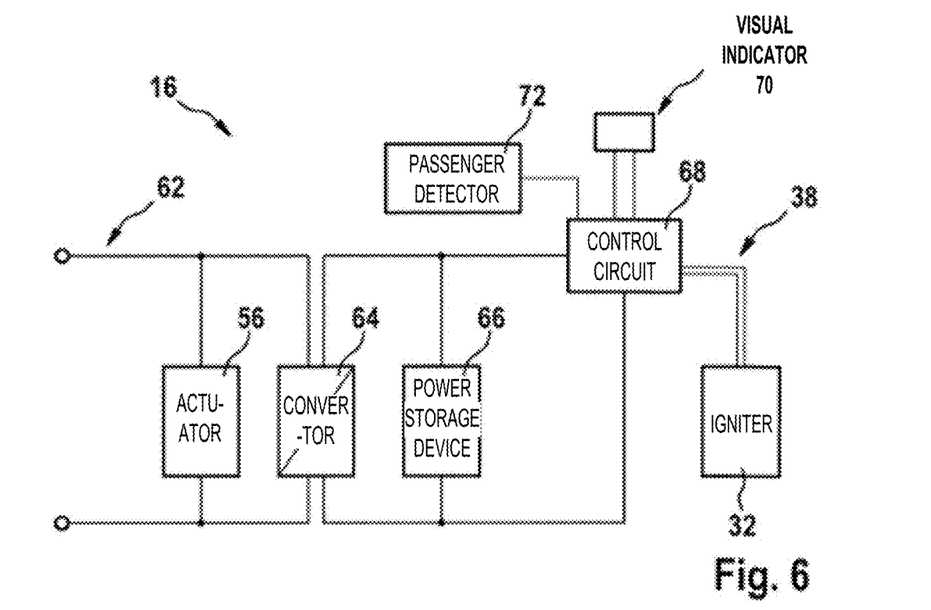
FIG. 6 depicts a schematic block-diagram of a controller of an aircraft passenger oxygen supply module according to an exemplary embodiment of the invention.

FIG. 6 depicts a schematic block-diagram of a controller 16 of an oxygen generator according to an exemplary embodiment of the invention.

In the embodiment depicted in FIG. 6, the actuator 56 for moving the locking mechanism 54 (cf. FIG. 5) is operated with AC electric power supplied by a power supply system of the aircraft 100.

The portion of the controller 16 controlling the activation of the oxygen generator 20, however, is operated with DC electric power. Using DC electric power allows for conveniently storing electric power in an electric power storage device 66, such as a capacitor. The electric power storage device 66 may be configured for supplying sufficient electric energy for at least 5 seconds, in order to allow for activating the oxygen generator 20 with the pyroelectric igniter 32, even in case of failure of the power supply system of the aircraft 100. In order to full functioning of the aircraft passenger oxygen supply module 2 even in the case of power failure, the actuator 56 may be configured such that it moves the locking mechanism 54 into its unlocked position in case of power failure.

In order to allow for operating the portion of the controller 16 controlling the activation of the oxygen generator 20 with DC electric power, the controller comprises an AC/DC electric power converter 64. The AC/DC electric power converter 64 is configured for converting AC electric power received on an input side, which is electrically coupled to the power supply of the aircraft 100 via the electric conductors 62, to DC electric power provided at an output side.

The electric power storage device 66 and the pyroelectric igniter 32 are electrically coupled to the output side of the AC/DC electric power converter 64.

In case of an emergency situation including a pressure drop within the aircraft passenger cabin 104, an activation signal is supplied via the electric conductors 62. In reaction to receiving the activation signal, the actuator 56 moves the locking mechanism 54 into its unlocked position, allowing the movable door 52 to open for providing access to the oxygen mask(s) 12, stored within the compartment 48.

Additionally, DC electric power, which is output from the output side of the AC/DC electric power converter 64, is supplied to the pyroelectric igniter 32, activating the oxygen generating substance 26 for providing oxygen gas to at least one oxygen mask 12, fluidly coupled to the oxygen outlet 28 of the oxygen generator 20. In an embodiment, electric power is supplied to the pyroelectric igniter 32 for activating the oxygen generating substance 26 only after an electric activation switch has been activated, e.g. by pulling at least one of the oxygen masks 12 towards a passenger, as it has been mentioned before.

In order to allow for testing the aircraft passenger oxygen supply module 2, it is desirable to allow for testing the operability of the actuator 56, the locking mechanism 54, the movable door 52, and the pyroelectric igniter 32 without actually activating the oxygen generator 20.

The controller 16 of FIG. 6, therefore, further comprises a control circuit 68 that allows for selectively operating the aircraft passenger oxygen supply module 2 in a test mode.

When the aircraft passenger oxygen supply module 2 is operated in the test mode, the actuator 56 is operated for unlocking the movable door 52, in order to allow for testing the operability of the movable door 52, the locking mechanism 54, and the actuator 56.

In order to prevent the oxygen generating substance 26 from being activated, only a small electric test voltage, which is not sufficient for triggering the pyroelectric igniter, is applied to the electric conductors 38 of the pyroelectric igniter 32. By measuring the electric current flowing through the pyroelectric igniter 32 when the electric test voltage has been applied, it is possible to determine whether the electric glow wire 42 of the pyroelectric igniter 32 is still intact. The result of said test may be indicated by a visual indicator 70, such as an LED. Alternatively or additionally, a confirmation signal, in particular a digital confirmation signal, confirming the operability of the pyroelectric igniter 32 may be provided to a safety system of aircraft 100.

Figure 7:
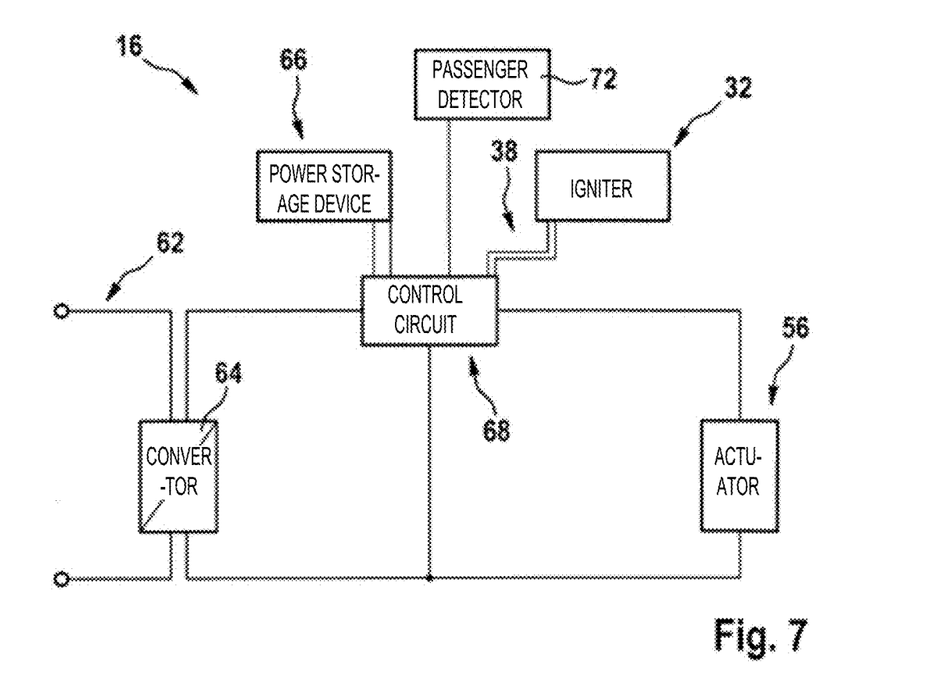
FIG. 7 depicts a schematic block-diagram of a controller of an aircraft passenger oxygen supply module according to another exemplary embodiment of the invention.

FIG. 7 depicts a schematic block-diagram of a controller 16 of an oxygen generator according to another exemplary embodiment of the invention.

In the exemplary embodiment depicted in FIG. 7, the pyroelectric igniter 32 and the actuator 56 of the locking mechanism 54 are both operated with DC electric power, provided on the output side of the AC/DC electric power converter 64.

In such a configuration, the actuator 56 is configured for being operated with DC electric power, and the electric power storage device 66 has sufficient capacity for operating both, the pyroelectric igniter 32 and the actuator 56 for at least 5 seconds after a failure of the power supply system of the aircraft 100 has occurred.

The exemplary embodiment of the controller 16 depicted in FIG. 7 may allow for using the movable door 52 as an indicator for the functionality of the pyroelectric igniter 32.

When the controller 16 depicted in FIG. 7 is operated in the test mode, the control circuit 68 first tests the integrity of the electric glow wire 42 of the pyroelectric igniter 32 by applying a small electric test voltage, which is not sufficient for igniting the pyroelectric igniter 32, to the electric conductors 38 of the pyroelectric igniter 32, as in has been described before with respect to the embodiment of the controller depicted in FIG. 6. The electric current flowing through the electric glow wire 42 is measured for testing the integrity of the glow wire 42.

If the integrity of the electric glow wire 42 has been confirmed, the actuator 56 is controlled for moving the locking mechanism 54 into its unlocked position allowing the movable door 52 to open. In case, however, the integrity of the electric glow wire 42 cannot be confirmed, the actuator 56 is not activated and the movable door 52 will stay closed.

In consequence, in the exemplary embodiment of a controller 16 depicted in FIG. 7, an opening of the movable door 52, when the controller 16 is operated in the test mode, indicates that the electric glow wire 42 of the pyroelectric igniter 32, the locking mechanism 54, and the actuator 56 of the movable door 52 are intact. Failure of any of the electric glow wire 42, the locking mechanism 54, and the actuator 56 is indicated by the movable door 52 remaining closed. Thus, in an embodiment of the controller 16 as it is depicted in FIG. 7, an additional visual indicator 70, such as an LED (cf. FIG. 6), can be dispensed with for indicating the result of the functionality test.

In both embodiments, the aircraft passenger oxygen supply module 2 may further comprise at least one passenger detector 72, which is configured for detecting the presence of a passenger within at least one passenger seat 106 associated with the aircraft passenger oxygen supply module 2. The at least one passenger detector 72 may be part of the controller 16, or it may be provided separately from the controller 16.

In an embodiment comprising at least one passenger detector 72, the controller 16 may be configured for switching the operation of a pyroelectric igniter 32 electrically coupled with the controller 16 into the test mode, in which the pyroelectric igniter 32 is not activated, if the at least one passenger detector 72 detects that none of the passenger seats 106 associated with the aircraft passenger oxygen supply module 2 is occupied. In consequence, an unnecessary activation of an oxygen generator 20, which is associated only with unoccupied passenger seats 106, can be prevented and the oxygen generating substance can be saved for later use.

If the aircraft passenger oxygen supply module 2 is to be installed in an aircraft 100 comprising a DC electric power supply system, i.e. an electric power supply system configured for providing DC electric power, the AC/DC electric power converter 64 may be omitted. In such a configuration, an optional DC/DC electric power converter may by provided for changing the voltage of the DC electric power provided by the power supply system of the aircraft 100 in order to allow operating the aircraft passenger oxygen supply module 2 with a voltage that differs from the voltage provided by the electric power supply system of the aircraft 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An oxygen generator for use in a passenger aircraft, the oxygen generator comprising:
   an oxygen generating substance for generating oxygen gas after being activated;
   an activating substance for activating the oxygen generating substance;
   a pyroelectric igniter for igniting the activating substance upon receiving an electric trigger input;
   a housing defining a gas-tight chamber, accommodating the oxygen generating substance, the activating substance and the pyroelectric igniter;
   at least two electric conductors, coupled to the pyroelectric igniter and extending through a passage in the housing between an interior of the gas-tight chamber and an exterior of the gas-tight chamber; and
   at least one of a gas-tight glass-to-metal sealing and a gas-tight ceramic-to-metal sealing, sealing the at least two electric conductors with respect to the housing at the passage.

2. The oxygen generator according to claim 1, wherein the pyroelectric igniter includes an electric glow wire, which is coupled to the electric conductors and which is in contact with at least one heat sensitive and explosive pyroelectric substance.

3. The oxygen generator according to claim 1, wherein the pyroelectric igniter is configured for being operated with an ignition voltage in the range of between 100 V and 150 V.

4. The oxygen generator according to claim 1, wherein the oxygen generating substance includes sodium chlorate.

5. The oxygen generator according to claim 1, including a bushing, forming the passage for the at least two electric conductors between the interior of the gas-tight chamber and the exterior of the gas-tight chamber, wherein the bushing is welded or soldered to the housing, and wherein said at least one of a gas-tight glass-to-metal sealing and a gas-tight ceramic-to-metal sealing is arranged for sealing the at least two electric conductors with respect to the bushing.

6. The oxygen generator according to claim 5, wherein the bushing comprises a collar extending along an outer periphery of the bushing, the collar being welded or soldered to a housing of the oxygen generator.

7. An aircraft passenger oxygen supply module for supplying oxygen to at least one aircraft passenger, the aircraft passenger oxygen supply module comprising:
   the oxygen generator according to any of the preceding claims; and
   at least one oxygen mask fluidly connected to an oxygen outlet of the oxygen generator.

8. The aircraft passenger oxygen supply module according to claim 7, further comprising:
   a compartment, providing a storage space for storing the at least one oxygen mask;
   a movable door, which is movable between a closed position, closing the compartment, and an open position, in which the compartment is open, providing access to the at least one oxygen mask;
   a locking mechanism, which is movable between a locked position, in which the locking mechanism locks the movable door, and an unlocked position, in which the locking mechanism does not lock movable door; and
   an actuator for moving the locking mechanism between the locked position and the unlocked position.

9. The aircraft passenger oxygen supply module according to claim 8, further comprising:
   an AC/DC electric power converter for converting AC electric power, supplied to the aircraft passenger oxygen supply module, to DC electric power;
   wherein the aircraft passenger oxygen supply module is configured for selectively supplying AC electric power to the actuator for moving the locking mechanism into its unlocked position, releasing the movable door, and for selectively supplying DC electric power to the pyroelectric igniter for activating the pyroelectric igniter; or
   wherein the aircraft passenger oxygen supply module is configured for selectively supplying DC electric power to the actuator for moving the locking mechanism into its unlocked position, releasing the movable door, and for selectively supplying DC electric power to the pyroelectric igniter for activating the pyroelectric igniter.

10. The aircraft passenger oxygen supply module according to claim 9, further comprising an electric storage device, in particular a capacitor, for storing DC electric energy.

11. The aircraft passenger oxygen supply module according to claim 7, wherein the aircraft passenger oxygen supply module is selectively operable in a test mode and in an emergency mode;
   wherein operating the aircraft passenger oxygen supply module in the test mode includes checking the electric conductivity of the pyroelectric igniter and/or operating the actuator for moving the locking mechanism into its unlocked position, releasing the movable door; and
   wherein operating the aircraft passenger oxygen supply module in the emergency mode includes activating the pyroelectric igniter and operating the actuator for moving the locking mechanism into its unlocked position, releasing the movable door.

12. A passenger aircraft comprising a plurality of oxygen generators according to claim 1.

13. A passenger aircraft comprising a plurality of aircraft passenger oxygen supply modules according to claim 7.

14. A method of operating the oxygen generator according to claim 1 in a passenger aircraft, wherein the method includes activating the pyroelectric igniter by supplying an ignition voltage and/or an ignition current to the pyroelectric igniter.

15. A method of operating the aircraft passenger oxygen supply module according to claim 7 in a test mode, wherein the method includes operating the actuator for moving the locking mechanism into its unlocked position and/or checking an electric conductivity of the pyroelectric igniter, wherein the method includes visually signalling a result of checking the electric conductivity of the pyroelectric igniter, by operating a visual indicator, the visual indicator comprising a signalling LED.

16. The method of operating an aircraft passenger oxygen supply module according to claim 7 in an emergency mode, wherein the method includes operating the actuator for moving the locking mechanism into its unlocked position and activating the pyroelectric igniter by supplying an ignition voltage and/or an ignition current to the pyroelectric igniter.

17. The oxygen generator according to claim 2, wherein the electric glow wire is surrounded by the at least one heat sensitive and explosive pyroelectric substance.

18. The oxygen generator according to claim 3, wherein the pyroelectric igniter is configured for being operated with an ignition voltage in the range of between 110 V and 120 V.

19. The oxygen generator according to claim 3, wherein the pyroelectric igniter is configured for being operated with an ignition voltage in the range of between 25 V and 30 V.

20. The oxygen generator according to claim 3, wherein the pyroelectric igniter is configured for being operated with an ignition voltage of approximately 115 V, and/or wherein the pyroelectric igniter is configured for being operated with an ignition voltage of approximately 28 V.

* * * * *

UNITED STATES PATENT AND TRADEMARK OFFICE
CERTIFICATE OF CORRECTION

PATENT NO. : 12,397,182 B2
APPLICATION NO. : 17/869318
DATED : August 26, 2025
INVENTOR(S) : Detlev Degenhardt et al.

Page 1 of 1

It is certified that error appears in the above-identified patent and that said Letters Patent is hereby corrected as shown below:

In the Claims

Claim 10, Column 14, Line 20 -please delete "in particular" and insert -- the electric storage device comprising --
Claim 11, Column 14, Line 26 -please delete "the" and insert -- an --
Claim 16, Column 14, Line 53 -please delete "The" and insert -- A --, delete "an" and insert -- the --

Signed and Sealed this
Twenty-seventh Day of January, 2026

John A. Squires
*Director of the United States Patent and Trademark Office*